H. M. CLOUDE.
AUTOMOBILE LOCK.
APPLICATION FILED NOV. 14, 1916.

1,237,870.

Patented Aug. 21, 1917.
2 SHEETS—SHEET 1.

INVENTOR
HARRY M. CLOUDE,
BY
ATTORNEYS

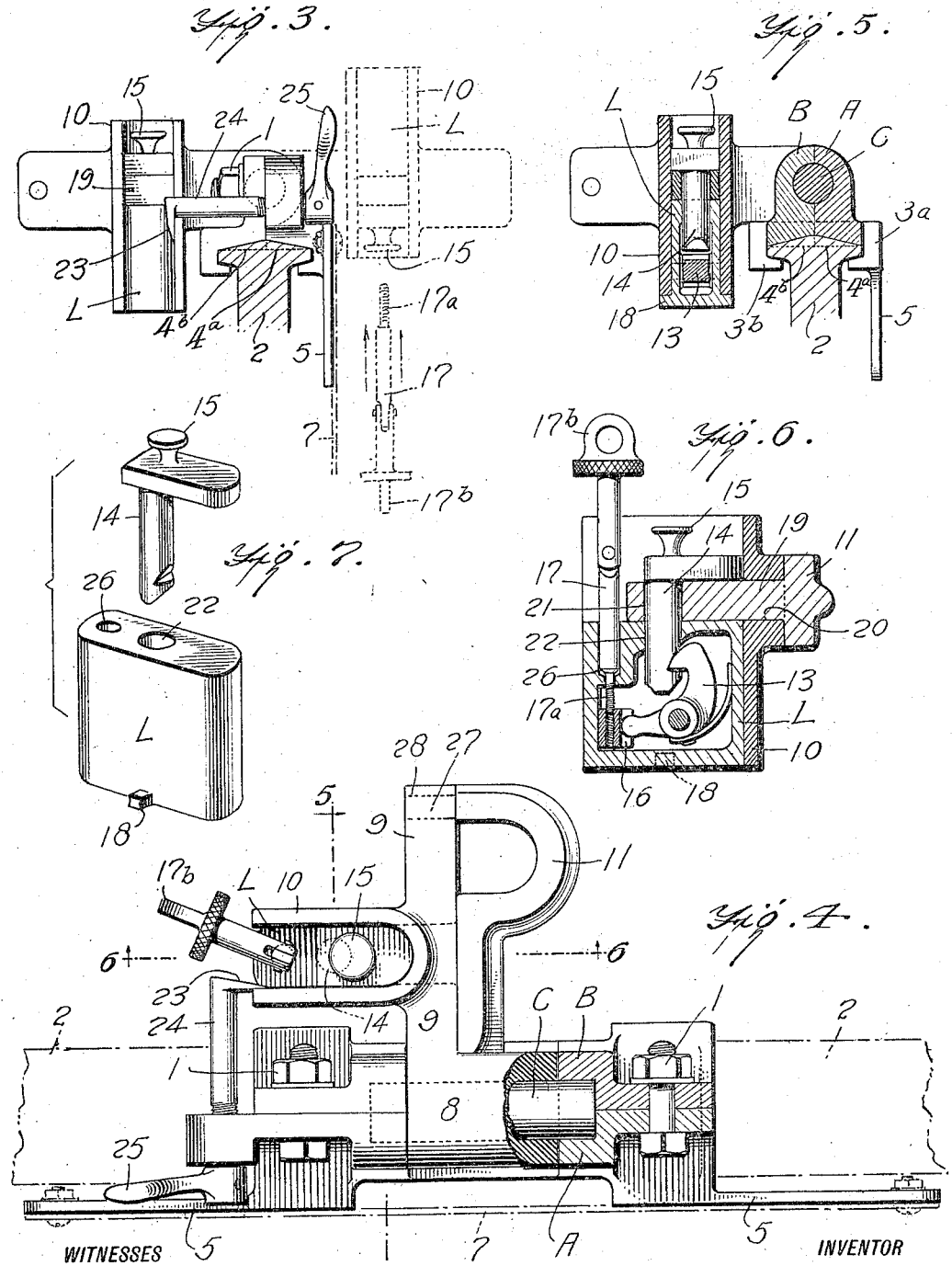

UNITED STATES PATENT OFFICE.

HARRY M. CLOUDE, OF CINCINNATI, OHIO.

AUTOMOBILE-LOCK.

1,237,870.　　　　　Specification of Letters Patent.　　Patented Aug. 21, 1917.

Application filed November 14, 1916.　Serial No. 131,314.

*To all whom it may concern:*

Be it known that I, HARRY M. CLOUDE, a citizen of the United States, and a resident of Cincinnati, in the county of Hamilton and State of Ohio, have made certain new and useful Improvements in Automobile-Locks, of which the following is a specification.

My invention relates to improvements in automobile locks, and it consists in the constructions, combinations and arrangements of parts hereinafter described and claimed.

An object of my invention is to provide a device by means of which the theft of cars having manual starting cranks may be prevented.

A further object of my invention is to provide a lock which is easily manipulated, but which effectually assures the locking of the working parts of the car so as to prevent their being brought into use except at the will of the owner.

A further object of my invention is to provide a device of the type described which is carried on the front axle of the car, and by means of which the crank handle is securely held in an inner position in which the clutch members are directly connected, thereby locking the engine to the axle.

Further objects and advantages will appear in the following specification and the novel features thereof will be particularly pointed out in the appended claims.

My invention is illustrated in the accompanying drawings forming a part of this application, in which:

Fig. 3 is an end view.

Fig. 4 is a plan view.

Fig. 5 is a section along the line 5—5 of Fig. 4.

Fig. 6 is a section along the line 6—6 of Fig. 4, and

Fig. 7 is a perspective view of the spring lock.

Figure 1:
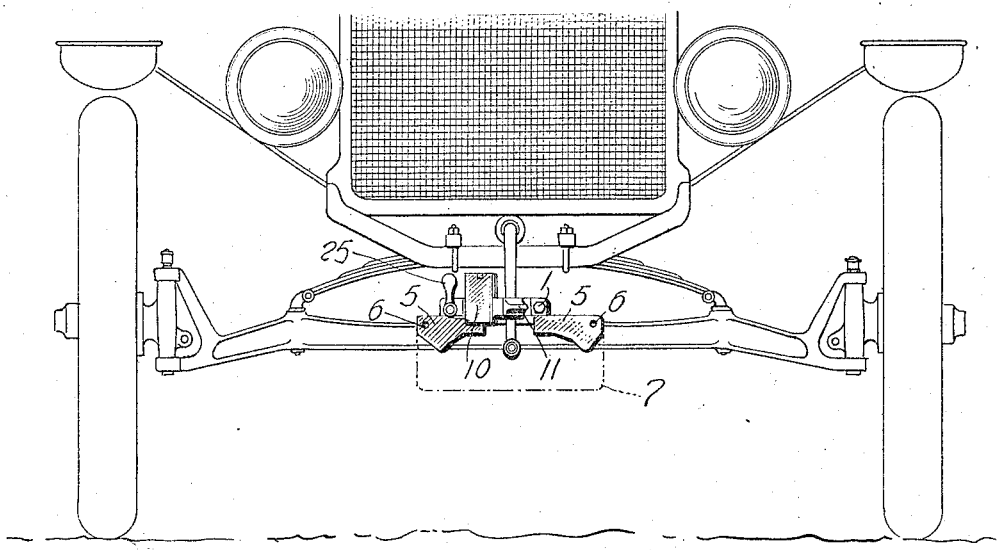
Figure 1 is a front view of a car showing my locking device applied thereto.
Figure 2:
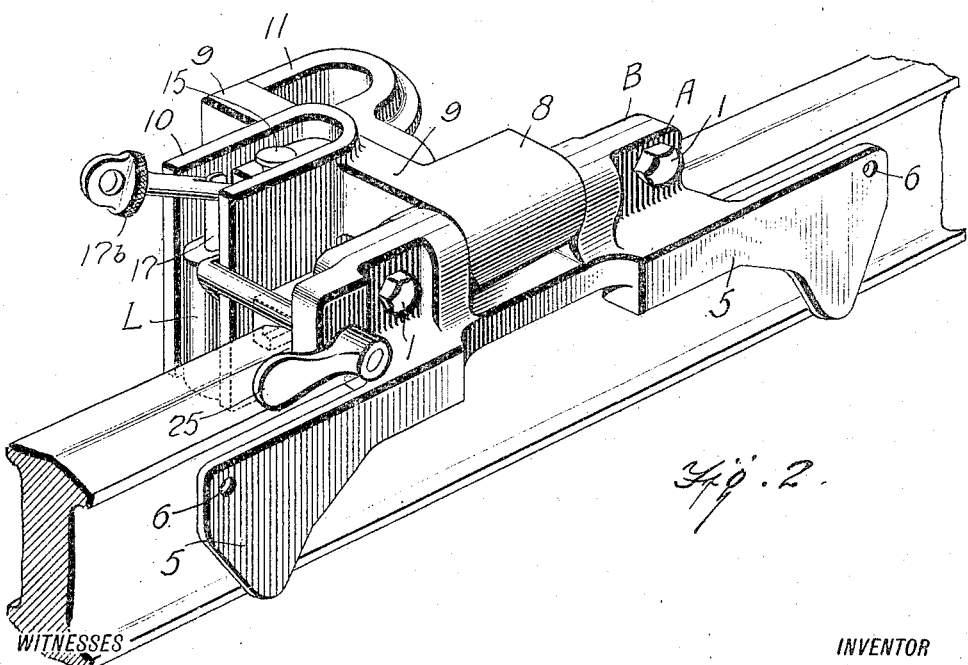
Fig. 2 is a perspective view.

In carrying out my invention I provide a body portion consisting of two parts, which I have denoted in general by A and B, these parts being held together by screw bolts 1. As will be seen from Fig. 5, the portions A and B are beveled, so as to fit on top of the front axle 2, lugs $3^a$ and $3^b$ being provided on the respective parts to extend underneath the axle flange so that when the parts are bolted together, the device is firmly clamped to the axle. In order to prevent longitudinal movement of the body portion with respect to the axle, I provide small end flanges $4^a$ and $4^b$, respectively, which are designed to enter a notch that may be filed or otherwise made in the top of the front axle. The portion A is provided with extensions 5, having openings 6, by means of which the license number sign 7 (see Fig. 1) may be attached.

Secured between the clamped portions A and B is a pin C, which forms a pivot for the locking mechanism proper. The latter consists of a sleeve 8 at one end of which is a laterally extending arm 9 bearing on one side a U-shaped socket 10. On the opposite side of the arm 9 is a locking member 11, which is designed to coöperate with the lock L, see Figs. 6 and 7, in the manner hereinafter described.

Referring particularly now to Figs. 6 and 7 I have shown therein a lock which I have designated in general by L, which consists of a casing having mounted therein a spring pressed locking dog 13. The upper end of this dog is arranged to engage a locking pin 14, which is provided with a thumb-hold 15, by means of which the pin may be removed. One end of the dog 13 is pivotally engaged by a threaded sleeve 16 which is adapted to receive the threaded end $17^a$ of a key 17. This key is made in two parts hinged together, and provided with a finger hold $17^b$. One end of the lock is provided with lugs 18, which are arranged to enter corresponding openings in the end of the lock L, see Figs. 5 and 7.

The locking member 11 is provided with a tongue 19, which projects through an opening 20 in the wall of the U-shaped socket 10. This tongue is provided with an opening 21, see Fig. 6, arranged to receive the locking pin 14, and which is in alinement with the opening 22 in the lock L, see Figs. 6 and 7.

From the foregoing description of the various parts of the device, the operation thereof may be readily understood.

Normally, the device is in the position shown in Fig. 4. In this position it will be observed that the arm 9 is swung toward the rear. In order to keep the device from rattling I provide a wedge-shaped member 23, which is carried by a rotatable rod 24, provided with a handle 25. This member enters between the lock L and the U-shaped socket 10, and may be withdrawn by turning the handle 25 when it is desired to lock the machine. When the machine is to be locked, the stem of the key 17 is inserted in the opening 26, see Figs. 6 and 7, and turned until the threaded end 17 has entered the threaded sleeve 16, and moves the latter far enough to cause the dog 13 to release the locking pin 14. The upper part of the key is then swung on its pivot and out of the way of the locking pin, as shown in Fig. 4, and the latter is withdrawn, thus permitting the locking member 11 to be pulled away from the arm 9. This arm is now swung over so that it faces forwardly. The crank handle is now pushed inwardly as in the ordinary manner of cranking the engine, and the locking member 11 is placed in position around the handle, the tongue 19 of the locking member entering the opening 20, and a guide member 27 shown in dotted lines in Fig. 4, also entering an opening 28 in the arm 9 so as to prevent rotation of the locking member 11. The locking pin is now inserted and pressed into position, the key being previously withdrawn. As soon as it is forced into position, the locking dog 13 will spring into place, thus preventing the withdrawal of the pin without the use of the key.

The parts are strong and durable and are not easily liable to get out of order. The locking and unlocking of the car may be quickly accomplished. The locking device, as has been pointed out, also serves as a means for securing the license number plate.

I desire to call particular attention to the function of the U-shaped socket 10. This socket forms a housing for the lock L so that it cannot be pried apart or tampered with. It forms an effective means for inclosing the lock, but at the same time the lock may be readily withdrawn from the housing when the tongue 19 and the locking pin 14 are removed. I consider this one of the main features of my invention.

I claim:—

1. A locking device for automobiles comprising a body portion consisting of two parts, means for clamping the parts about the front axle of an automobile, a pivoted locking member carried by said body portion and arranged to swing into and out of engagement with the crank handle of the vehicle, a detachable hasp arranged to straddle the crank handle of the vehicle, and a removable spring lock carried by said pivoted locking member for locking the hasp, thereby holding the crank handle in fixed position, said spring lock having a removable locking pin for connecting the hasp with the lock.

2. A locking device for automobiles comprising a body portion consisting of two parts, means for clamping the parts about the front axle of an automobile, a pivoted locking member carried by said body portion and arranged to swing into and out of engagement with the crank handle of the vehicle, a detachable hasp arranged to straddle the crank handle of the vehicle, a housing carried by said pivoted locking member, a removable spring lock disposed in said housing for locking the hasp, thereby holding the crank handle in fixed position, said spring lock having a removable locking pin for connecting the hasp with the lock.

3. A locking device for automobiles comprising a body portion consisting of two parts, means for clamping the parts about the front axle of an automobile, a pivoted locking member carried by said body portion and arranged to swing into and out of engagement with the crank handle of the vehicle, a detachable hasp arranged to straddle the crank handle of the vehicle, a housing carried by said pivoted locking member, a removable spring lock disposed in said housing for locking the hasp, thereby holding the crank handle in fixed position, said spring lock having a removable locking pin for connecting the hasp with the lock, and means for wedging the casing of the spring lock against the housing wall to prevent the rattling of the lock in the housing.

HARRY M. CLOUDE.

Copies of this patent may be obtained for five cents each, by addressing the "Commissioner of Patents, Washington, D. C."